Jan. 14, 1964
H. G. IRWIN
3,117,510
GASEOUS-CONDIMENT GENERATOR
Filed June 8, 1960
9 Sheets-Sheet 1
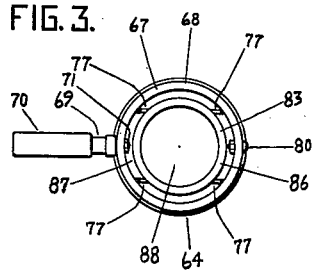
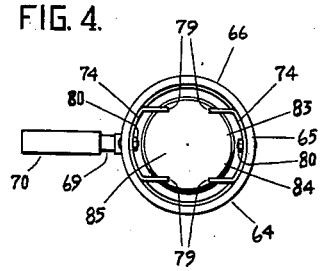
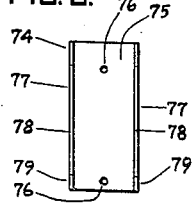
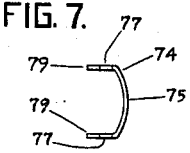
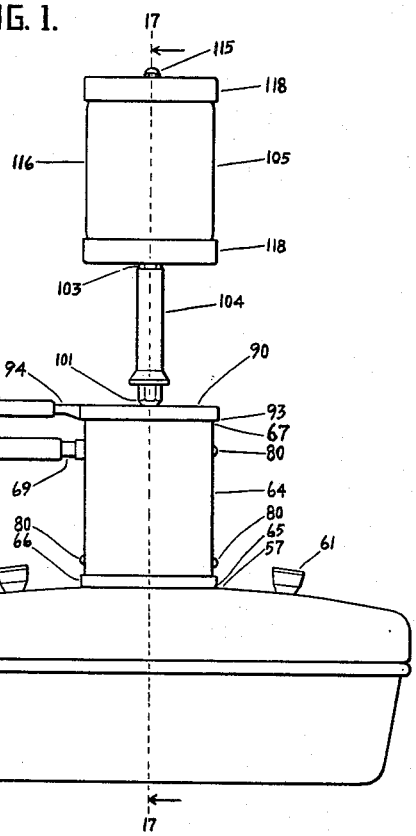
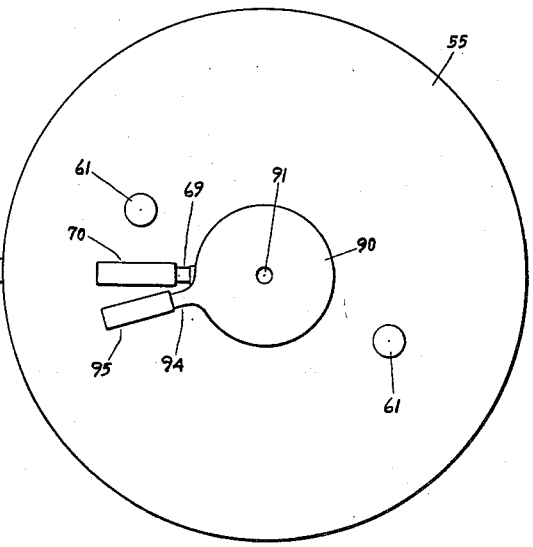

Jan. 14, 1964        H. G. IRWIN        3,117,510
GASEOUS-CONDIMENT GENERATOR
Filed June 8, 1960        9 Sheets-Sheet 2
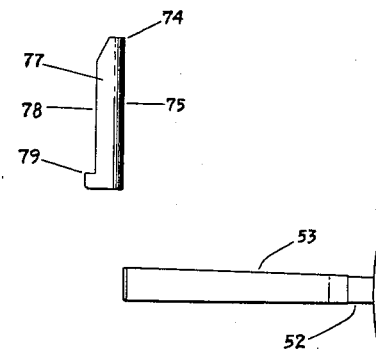
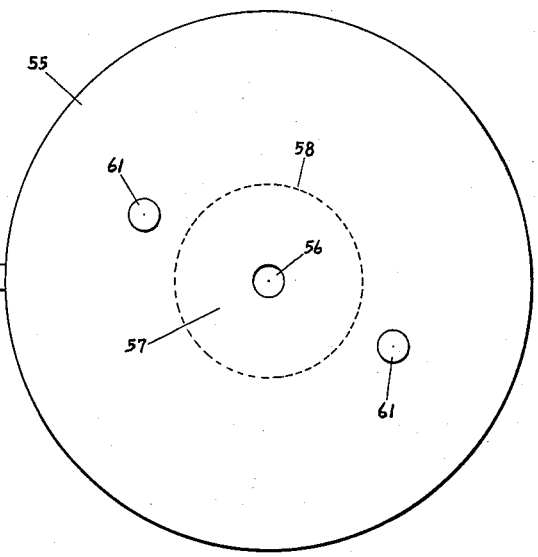
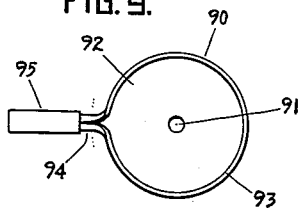
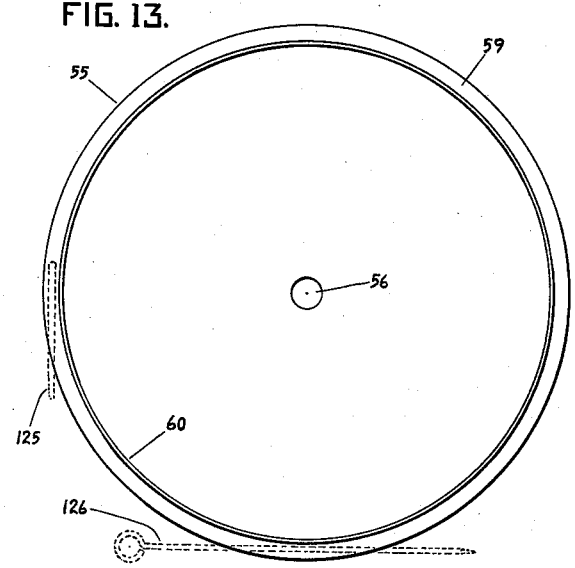
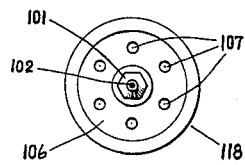
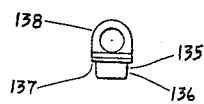
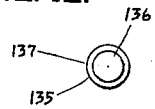

Jan. 14, 1964     H. G. IRWIN     3,117,510
GASEOUS-CONDIMENT GENERATOR
Filed June 8, 1960     9 Sheets-Sheet 3

Jan. 14, 1964   H. G. IRWIN   3,117,510
GASEOUS-CONDIMENT GENERATOR
Filed June 8, 1960   9 Sheets-Sheet 4
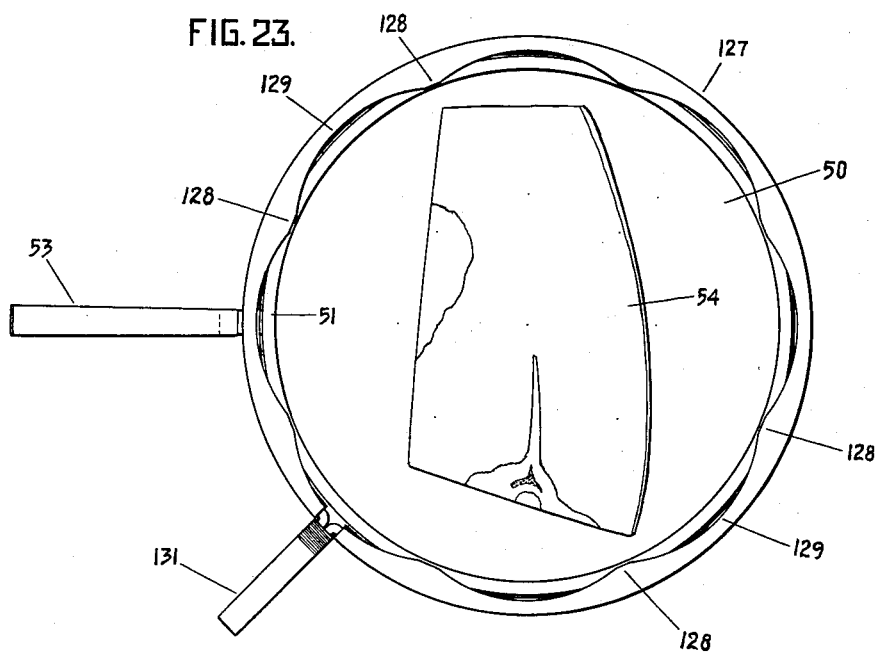
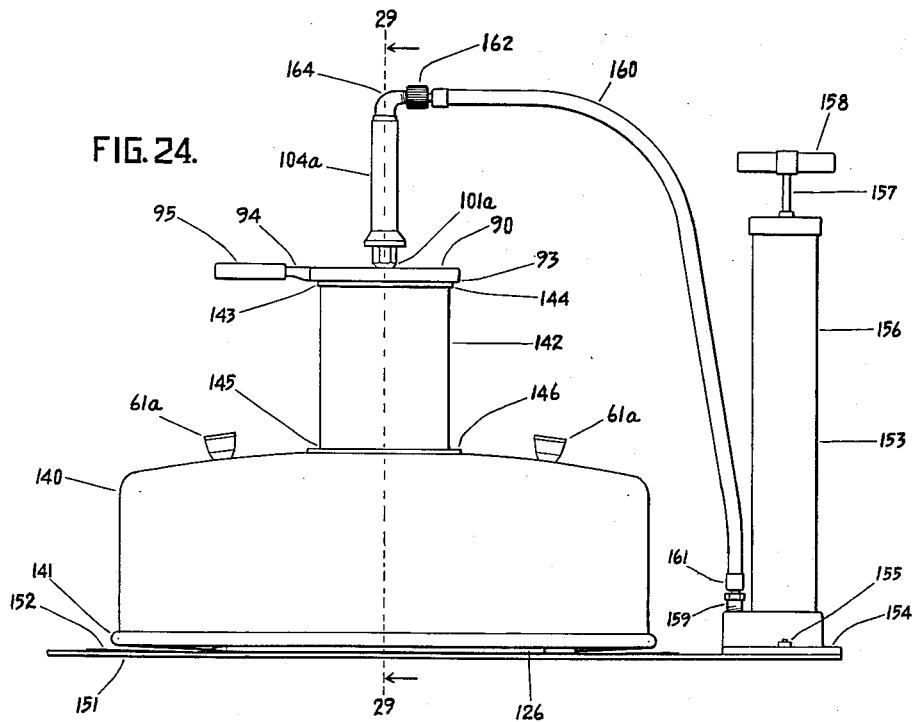

Jan. 14, 1964  H. G. IRWIN  3,117,510
GASEOUS-CONDIMENT GENERATOR
Filed June 8, 1960  9 Sheets-Sheet 5

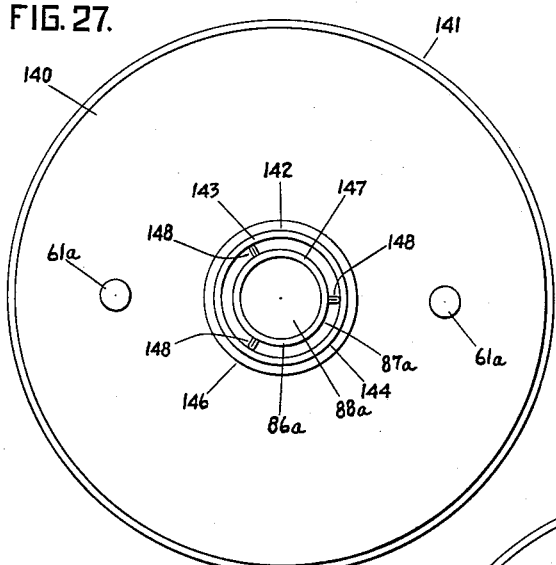
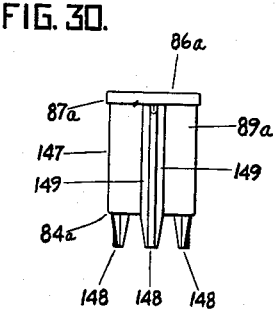
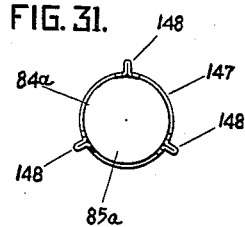
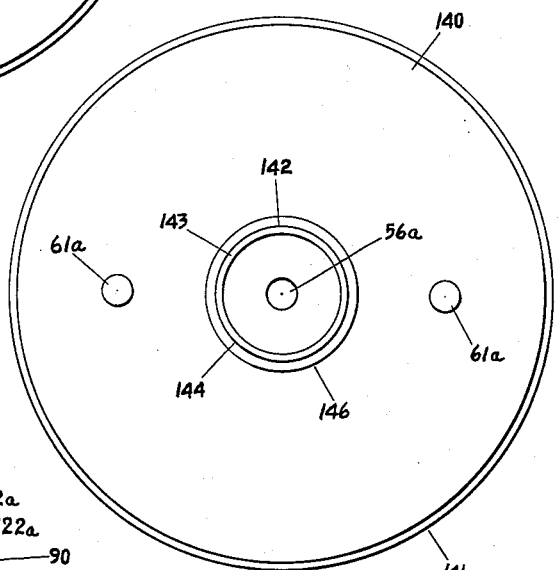
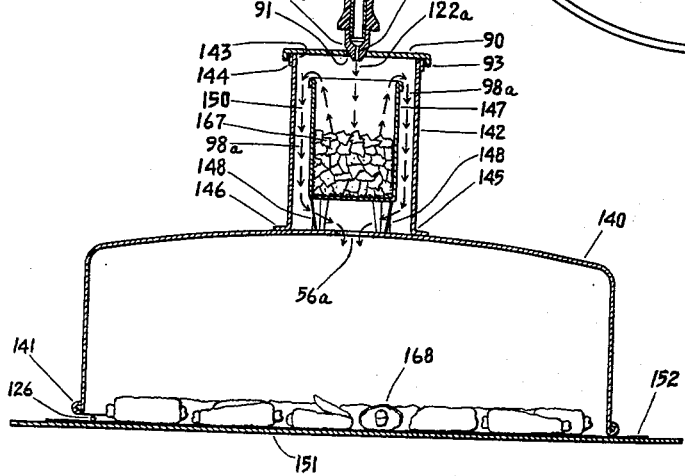

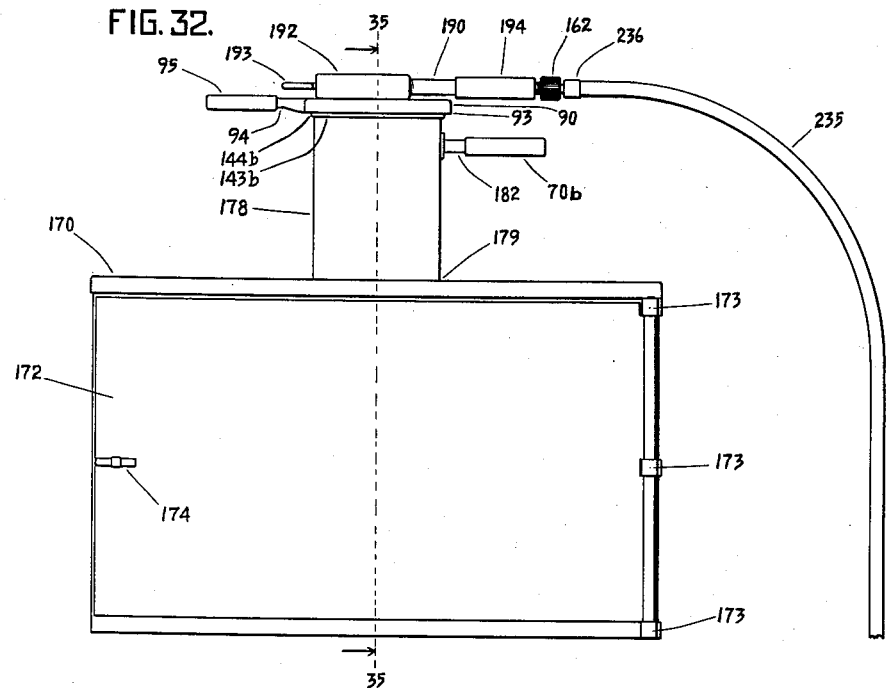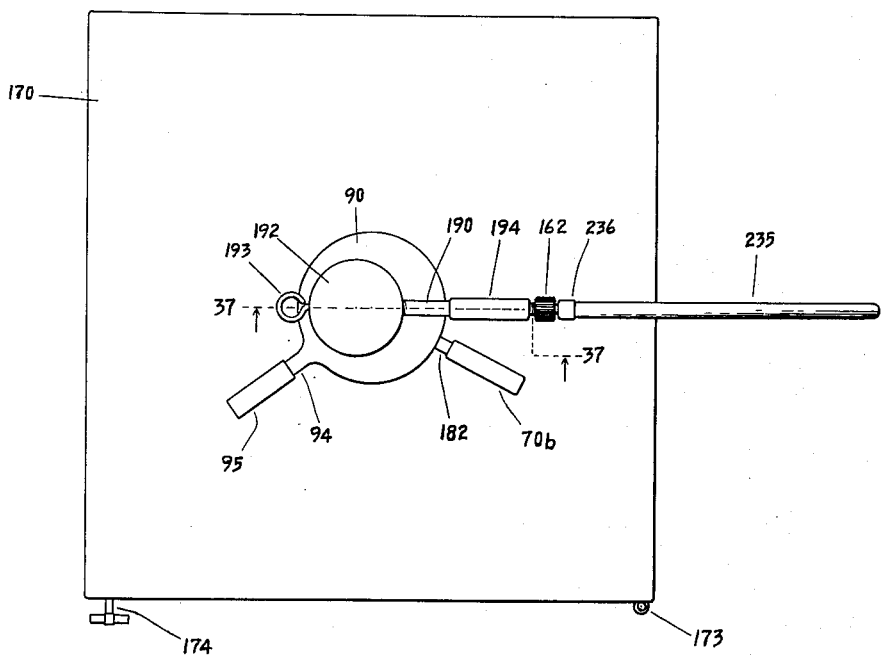

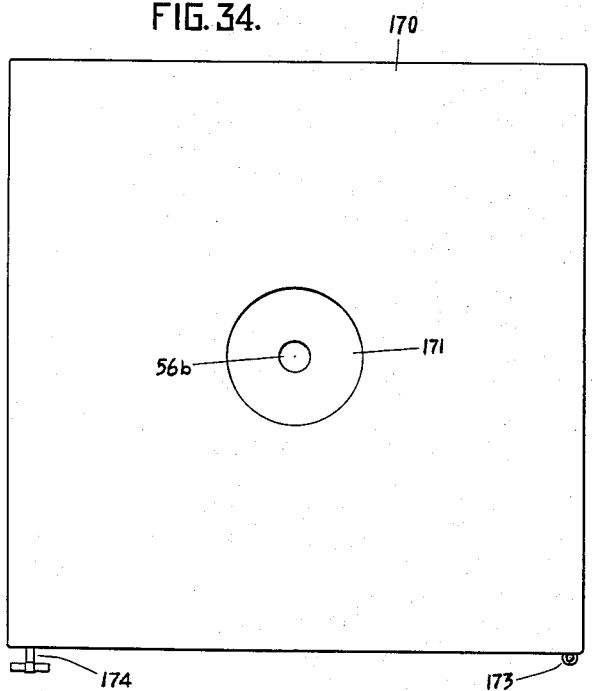
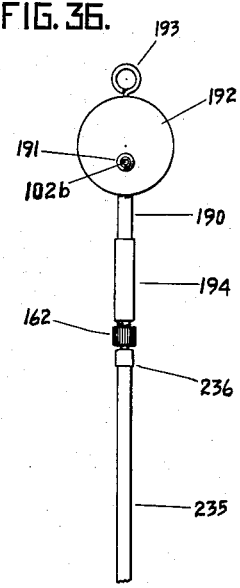
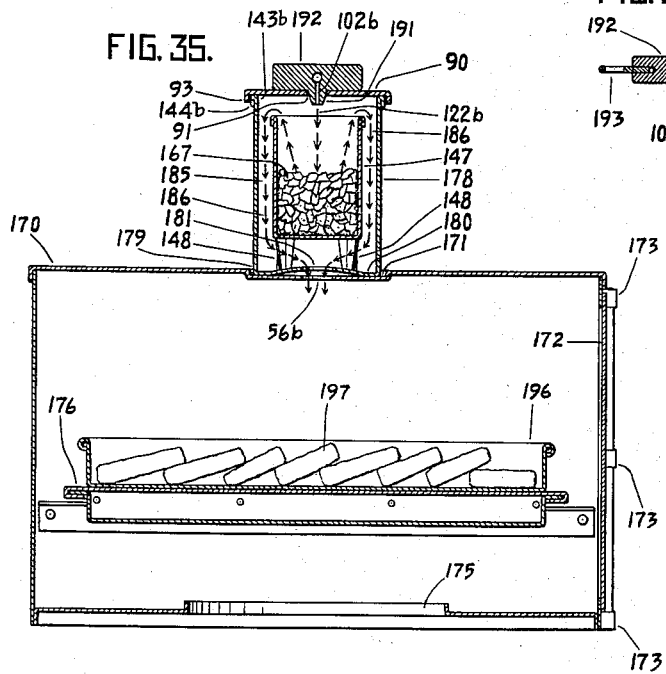
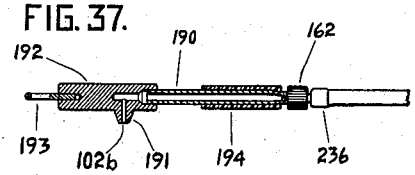
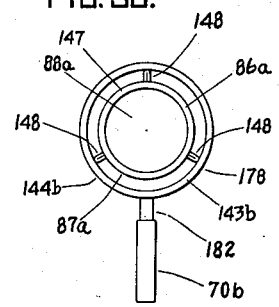

Jan. 14, 1964     H. G. IRWIN     3,117,510
GASEOUS-CONDIMENT GENERATOR
Filed June 8, 1960     9 Sheets-Sheet 9
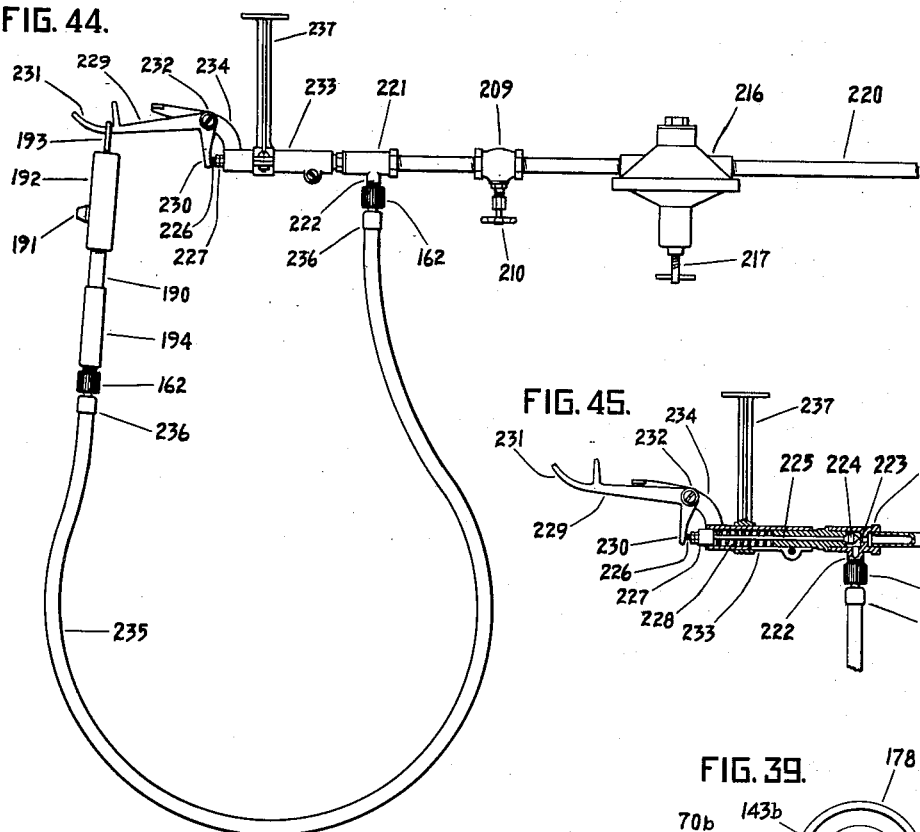
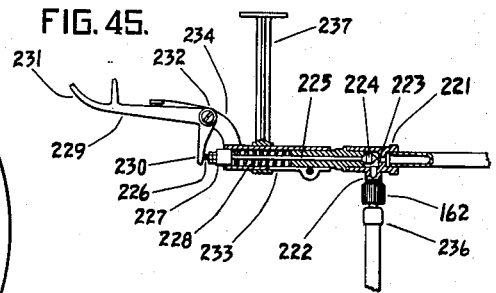
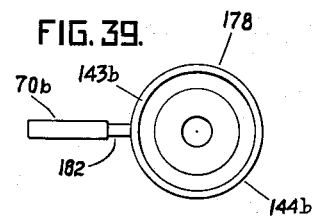
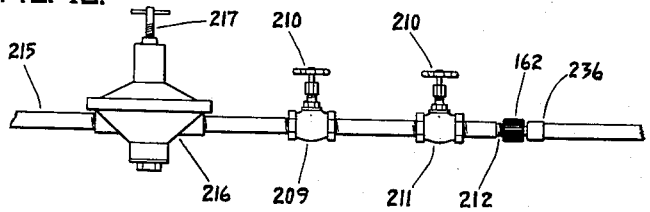
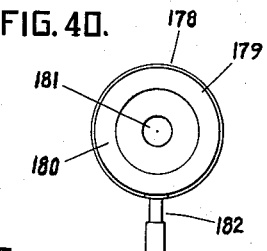
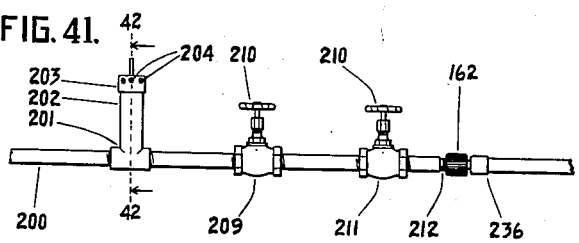
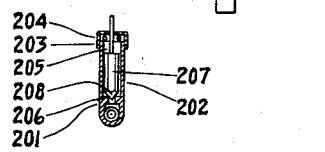

United States Patent Office 3,117,510
Patented Jan. 14, 1964

3,117,510
GASEOUS-CONDIMENT GENERATOR
Herbert G. Irwin, Box G, Noble, La.
Filed June 8, 1960, Ser. No. 34,801
3 Claims. (Cl. 99—260)

This invention relates to a gaseous-condiment generator, and contemplates a gaseous-condiment generator including a brasier in a brasier casing on a food cover, whereby food can be covered with the food cover and given a pleasant flavor with gaseous condiment generated by burning and/or vaporizing suitable gaseous condiment generating material in the brasier.

Other objects and advantages of this invention will appear throughout the following specificaion and claims.

In the drawing accompanying and forming a part of this specification.

FIGURE 1 is an elevational view of a gaseous-condiment generator constructed in accordance with the present invention and including a brasier in a covered removable brasier casing on a food cover. The food cover is set up on a frying pan which will hold food under the food cover, and an air feed pipe with a bellows has an air outflow end in a hole through the brasier casing cover.

FIGURE 2 is a top view of the form of food cover and brasier casing cover shown in FIGURE 1. The food cover as shown is supported on the frying pan. The brasier casing cover as shown is supported on the brasier casing seated on the food cover, but the air outflow end of the air feed pipe is removed from the hole through the braiser casing cover.

FIGURE 3 is an upper end view of the form of brasier casing shown on the food cover in FIGURE 1. The brasier casing as shown is removed from the food cover, and the brasier casing cover is removed from the brasier casing to afford an upper end view of the brasier in the brasier casing.

FIGURE 4 is a lower end view of the form of brasier casing and brasier shown in FIGURE 3.

FIGURE 5 is a view similar to FIGURE 3, but the brasier is removed from the brasier casing to afford a better view of the brasier supports in the brasier casing.

FIGURE 6 is an edge view of one of the detachable brasier supports shown in the brasier casing in FIGURES 3, 4 and 5. The brasier support as shown is detached from the brasier casing.

FIGURE 7 is an upper end view of the detached brasier support shown in FIGURE 6.

FIGURE 8 is a side view of the detached brasier support shown in FIGURES 6 and 7.

FIGURE 9 is an under face view of the removable brasier casing cover. The cover as shown is removed from the brasier casing.

FIGURE 10 is an elevational view of the form of brasier shown in the brasier casing in FIGURES 3 and 4. The brasier as shown is removed from the braiser casing.

FIGURE 11 is an end view of the air outflow end of the removable air feed pipe. The air feed pipe air outflow end as shown is removed from the hole through the brasier casing cover, but the bottom of the bellows is shown.

FIGURE 12 is a top view of the form of food cover shown in FIGURES 1 and 2. The food cover as shown is supported on the frying pan, but the brasier casing is removed from the food cover to afford a view of the brasier casing seat around the vapor passageway through the food cover.

FIGURE 13 is an under face view of the form of food cover shown in FIGURES 1, 2 and 12. The food cover as shown is removed from the frying pan.

FIGURE 14 is an elevational view of a vapor-passageway plug.

FIGURE 15 is a lower end view of the form of plug shown in FIGURE 14.

FIGURE 16 is an upper end view of the form of plug shown in FIGURES 14 and 15.

FIGURE 23 is an upper face view of the form of vent ring shown in FIGURES 21 and 22. The vent ring as shown is placed on the rim of the frying pan.

FIGURE 24 is an elevational view of a gaseous-condiment generator constructed in accordance with the present invention and including modification of a brasier casing rigid with a food cover. The food cover as shown is set up on a flat food plate which will hold food under the food cover.

Figure 25:
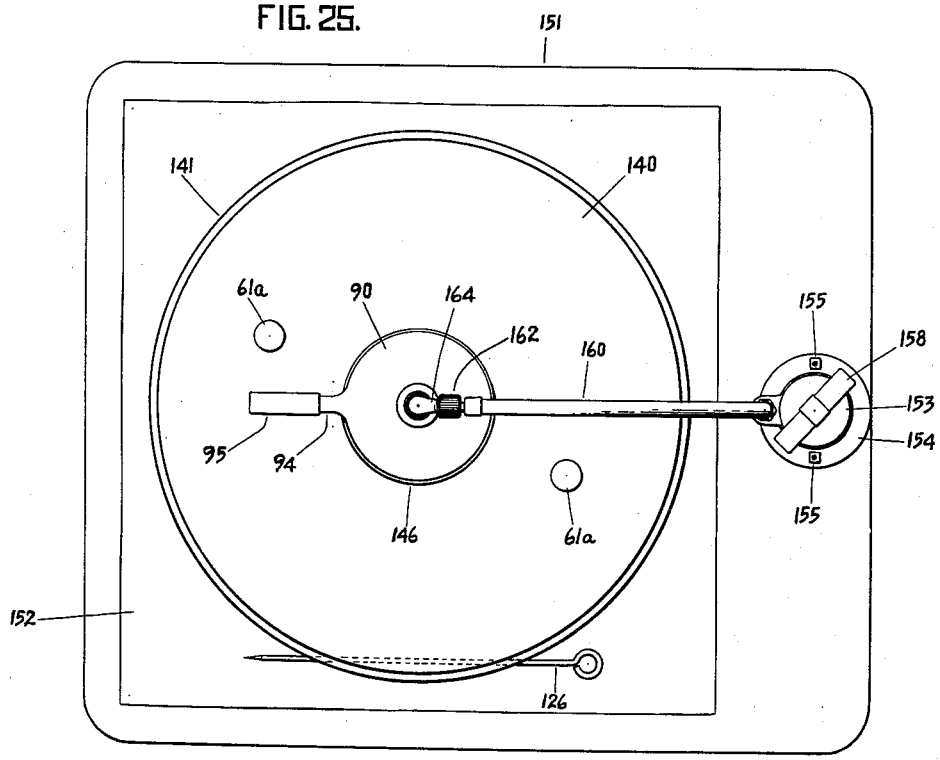
FIGURE 25 is a top view of the form of gaseous-condiment generator shown in FIGURE 24.
Figure 26:
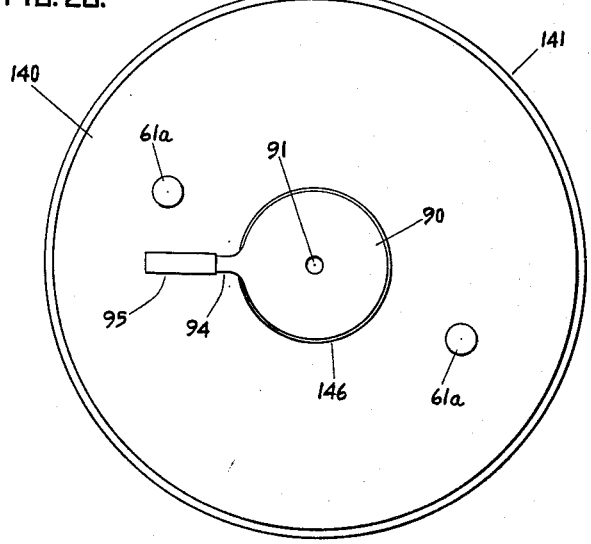

FIGURE 26 is a top view of the form of food cover shown in FIGURES 24 and 25. The food cover as shown is removed from the food plate. The brasier casing cover as shown is supported on the brasier casing, but the air outflow end of the air feed pipe is removed from the hole through the brasier casing cover.

FIGURE 27 is a view similar to FIGURE 26, but the brasier casing cover is removed from the brasier casing to afford an upper end view of the brasier in the brasier casing.

FIGURE 28 is a view similar to FIGURE 27, but the brasier is removed from the brasier casing to show the vapor pasasgeway through the food cover.

FIGURE 29 is a sectional view taken on broken line 29—29 of FIGURE 24.

FIGURE 30 is an elevational view of the form of brasier shown in FIGURES 27 and 29. The brasier as shown is removed from the brasier casing.

FIGURE 31 is a lower end view of the form of brasier shown in FIGURES 27, 29 and 30. The brasier as shown is removed from the brasier casing.

FIGURE 32 is an elevational view of a gaseous-condiment generator construoted in accordance with the present invention and including further modification of a removable brasier casing having a bottom at the lower end seated on a food cover. The food cover shown can be used for an oven.

FIGURE 33 is a top view of the form of gaseous-condiment generator shown in FIGURE 32.

FIGURE 34 is a top view of the form of food cover shown in FIGURES 32 and 33. The brasier casing is removed from the food cover to show the brasier casing seat around the vapor passageway through the food cover.

FIGURE 35 is a sectional view taken on broken line 35—35 of FIGURE 32.

FIGURE 36 is an end view of the air outflow end of the handle-section of air feed pipe shown in FIGURES 32 and 33. The air feed pipe air outflow end as shown is removed from the hole through the brasier casing cover.

FIGURE 37 is a sectional view of the handle-section of air feed pipe taken on broken line 37—37 of FIGURE 33.

FIGURE 38 is an upper end view of the form of brasier casing shown on the food cover in FIGURES 32 and 35. The brasier casing as shown is removed from the food cover, and the brasier casing cover is removed from the brasier casing to show the upper end of the brasier in the brasier casing.

FIGURE 39 is a view similar to FIGURE 38, but the brasier is removed from the brasier casing.

FIGURE 40 is a lower end view of the form of brasier casing shown in FIGURES 32, 35, 38 and 39. The brasier casing as shown is removed from the food cover.

FIGURE 41 is an elevational view of a portion of an air supply pipe line including an air escape valve and two air-flow control valves.

FIGURE 42 is a sectional view of the air escape valve taken on broken line 42—42 of FIGURE 41.

FIGURE 43 is an elevational view of a portion of an air supply pipe line including an air-pressure regulator valve and two air-flow control valves.

FIGURE 44 is an elevational view of a portion of an overhead air supply pipe line including an air-pressure regulator valve, an air-flow regulator valve, and a weight and lever closed air-flow stop valve.

FIGURE 45 is a longitudinal sectional view of the form of stop valve shown in FIGURE 44.

FIGURE 46 is an elevational view, partly cut away, of a funnel for funneling gaseous-condiment generating material into the brasier.

Upon reference to FIGURES 1, 2, 12, 13 and 17 of the drawing it will be noted that 55 indicates a food cover. The food cover has a through vapor passageway 56 shown in FIGURES 12 and 13, a brasier casing seat 57 on the food cover around the vapor passageway through the food cover, which brasier casing seat is the upper surface of the food cover around the passageway 56 outward to the broken circle line 58 shown in FIGURE 12, an under annular seat 59 shown in FIGURE 13, spaced apart knobs 61 and 61 which can be gripped with the fingers of the hands in placing the food cover on the frying pan 50 shown in FIGURE 1, and an under guide rim 60 to aid in locating the food cover seat 59 on the frying pan rim 51.

Figure 17:
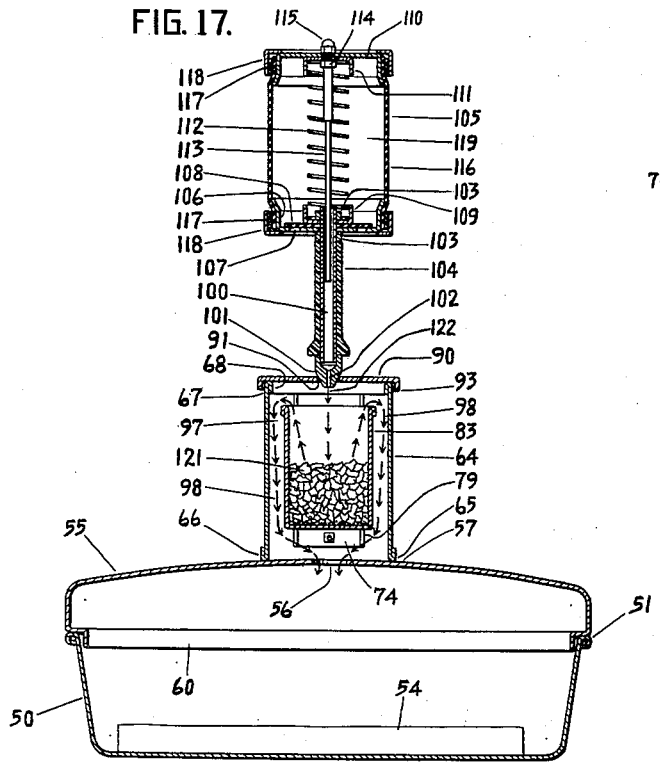
FIGURE 17 is a sectional view taken on broken line 17—17 of FIGURE 1.

On the food cover shown in FIGURES 1 and 2 is a removable brasier casing 64, and the brasier casing removed from the food cover is shown in FIGURES 3, 4 and 5. The brasier casing has a tubular handle 69, a lower end 65 with a rim 66, an upper end 67 with a rim 68, inside brasier supports 74 and 74, and as the brasier casing is shown in FIGURES 1 and 17 the brasier casing lower end is seated on the brasier casing seat 57. The brasier casing lower end fits the brasier casing seat closely all the way around.

In the brasier casing shown in FIGURES 1, 3 and 4 is a removable brasier 83 supported and spaced in the brasier casing on the brasier supports 74—74, and the brasier removed from the brasier casing is shown in FIGURE 10. The brasier has a lower end 84 with a bottom 85 shown in FIGURE 4, an upper end 86 with a rim 87 shown in FIGURE 3, and a mouth 88 to receive gaseous-condiment generating material including air into the brasier and to emit gaseous-condiment to flow under the food cover.

Brasier supports 74—74 are attached spaced apart to the inside of the brasier casing with attachment bolts 80—80—80 and the handle bolt 71, and one of the brasier supports removed from the brasier casing is shown in FIGURES 6, 7 and 8. Each brasier support has a back 75 with through attachment bolt holes 76—76, side portions 77 and 77 each of which side portions has an edge 78 to contact the side of the brasier and a projection 79 at the lower end to extend under the brasier bottom 85 as shown in FIGURE 4.

On the upper end of the brasier casing shown in FIGURE 1 is a removable brasier casing cover 90 also shown in FIGURE 2, and the brasier casing cover removed from the brasier casing is shown in FIGURE 9. The brasier casing cover has a handle 94, a through hole 91 to receive the air outflow end of an air feed pipe, an under face 92 which fits closely on the upper end of the brasier casing, and a downturned edge portion 93 to aid in locating the cover on the upper end of the brasier casing. As the brasier casing cover 90 is shown in FIGURES 1, 2 and 17 the hole 91 through the brasier casing cover is located over the brasier 83.

Out of the brasier to the vapor passageway 56 through the food cover is a vapor passageway 97 shown in FIGURE 17. The two series of arrows 98 and 98 in the passageway 97 indicate the way vapor, gas or air, flows in the passageway 97 to and through the passageway 56.

In the hole 91 through the brasier casing cover shown in FIGURE 1 is a downturned air outflow end 101 of an air feed pipe 100 shown in FIGURE 17. The air feed pipe air outflow end has an air outflow orifice 102 shown in FIGURE 11, and around the air feed pipe is a grip 104 for one hand. On the upper end of the air feed pipe is a bellows 105 shown in FIGURE 1. Shown in FIGURE 17, the bellows includes a cupped bellows bottom 106 clamped on the upper end of the air feed pipe between nuts 103 and 103 screwthreaded on the upper end of the pipe and which bottom is clamped in the lower end of a tubular diaphragm 116 with a winding 117 of suitable string covered with a pressed-on band 118, a cupped bellows head 110 clamped in the upper end of the tubular diaphragm with a winding 117 of suitable string covered with a pressed-on band 118, a flexible disc valve 108 and a spring-end cup 109 clamped with the bellows bottom on the upper end of the air feed pipe also in the bellows are a bellows head guide rod 113 and a spring-end cap 111 attached to the bellows head with nuts 114 and 115 screwthreaded on the upper end of the guide rod, a helix spiral spring 112 around the guide rod has a lower end pressing on the spring-end cup and an upper end pressing on the spring-end cap, air space 119 in the tubular diaphragm between the bellows bottom and the bellows head, an annular series of air inlet holes 107 through the bellows bottom under the bellows valve 108 shown in FIGURE 11, and the bellows head guide rod extends down into the air feed pipe with ample air passageway between the rod and the inside of the air feed pipe.

Some of the air in the bellows air space 119 can be blown out through the air feed pipe 100 by pressing the bellows head 110 down on an exhaust stroke. An exhaust stroke of air can be fed into the brasier from the air outflow end of the air feed pipe by pressing the bellows head down with one hand while holding the grip 104 with the other hand, and upon releasing the downward hand pressure on the bellows head the spring 112 will press the bellows head up on an air intake stroke which intake stroke will draw air through the valve covered air intake holes 107 into the air space 119. By pumping the bellows with one hand on the bellows head enough air can be fed into the brasier 83 to keep a fire of live coals or a charcoal fire burning in the brasier long enough to gas-flavor in the frying pan under the food cover a fried steak 54 with burning-coals gas or burning-charcoal gas from the brasier. A charge of live coals weighing about one ounce to put in the small brasier can be taken from a fire made with any kind of wood suitable for burning to smoke meat for food. A mesh-wire strainer can be used to hold the live coals as they are gathered from the wood fire, and upon removing the brasier casing cover 90 and placing a suitable funnel in the mouth of the brasier the live coals can be poured from the strainer through the funnel into the brasier.

Figure 21:
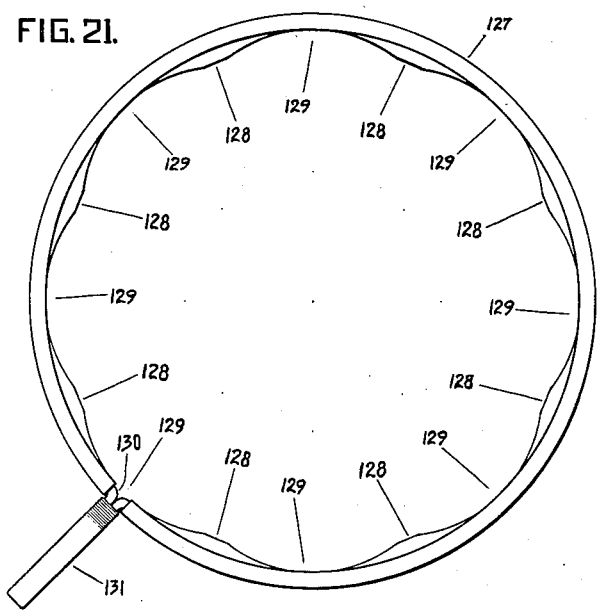
FIGURE 21 is an under face view of a food cover vent ring which can be placed on the rim of the frying pan.
Figure 22:
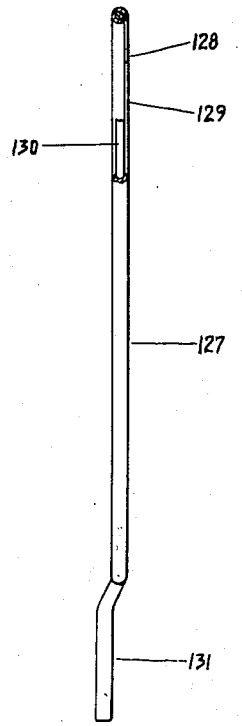
FIGURE 22 is an edge view of the form of vent ring shown in FIGURE 21. A portion of the ring is cut away to afford an edge view of one of the spacer points.

The series of arrows 122 shown in FIGURE 17 indicate the way air flows from the air outflow end of the air feed pipe to the charge of live coals 121 in the brasier, and the two series of arrows 93 and 98 indicate the way burning-coals gas flows out of the brasier to the passageway 56 through the food cover. The food cover is not made to fit air tight on the rim of the frying pan and air inclosed under the food cover can escape between the frying pan rim 51 and the food cover seat 59 as burning-coals gas from the brasier flows by the air feed pressure to and through the passageway 56 and under the food cover into the frying pan where some burning-coals gas flavor will be absorbed on fried food in the frying pan. A flat tooth pick indicated by broken lines 125 in FIGURE 13 can be placed with the wide end of the tooth pick between the food cover seat 59 and the frying pan rim 51 to give vent to air inclosed under the food cover as gas or vapor from the brasier flows under the food cover, or a pin indicated by broken lines 126 placed between the food cover seat and the frying pan rim will vent air from under the food cover as gas or vapor flows through the passageway 56. A vent ring 127 shown in FIGURES 21, 22 and shown placed on the rim 51 of the frying pan in FIGURE 23 has an annular series of flat spacer points 128, and between the spacer points are vent notches 129 which will give vent to a full flow of gas or vapor under the food cover. The vent ring spacer points 128 are attached to a wire ring 130 provided with a handle 131.

With the food cover seat and the frying pan rim parted with a tooth pick or a suitable pin, enough burning-coals gas can be generated and moved under the food cover to gas-flavor a fried steak in the frying pan under the food cover by feeding air into the burning coals in the brasier at a moderate rate for about five minutes, and some of a one-ounce charge of burning coals will be burned to ash and the ash deposited on the remaining coals and the bottom of the brasier. Filled full, the smaller brasier 83 will hold about two ounces by weight of burning coals or ignited charcoal, but a half full charge of about one ounce of coals leaves spatter space to catch particles of ash which the air feed flows from the surface of the top coals. A charge of live coals weighing about one ounce and one-half of an ounce put in the small brasier and fed with air at a rate somewhat above moderate for about five minutes will generate enough burning-coals gas to gas-flavor a fried steak under the food cover in the frying pan, and some fine particles of ash will be included in the gas flow out of the brasier into the frying pan where some of the carried over fine particles of ash will settle on the steak giving the steak a pleasant taste with the burning-coals gas flavor absorbed on the steak.

Charcoal made from wood suitable for burning to smoke meat for food and reduce to pieces of suitable size can be burned in the brasier. The charcoal should be carefully made and carefully handled to avoid any contamination with machinery lubricating oil or grease, and the charcoal should be stored in suitable containers to avoid any contamination in storage. In burning charcoal in the small brasier, the brasier can be charged with a split charge of one-half of the charge (about one-half of an ounce by weight) in new charcoal moistened with water and put in the brasier first, and the other half of the charge (about one-half of an ounce by weight) in ignited left-over charcoal for priming put in the brasier on top of the moistened new charcoal. Feeding air into the ignited priming charcoal for about five minutes at a moderate rate will generate enough heat to dry and ignite the new charcoal in the lower half of the charge, and the vapor and gas generated will move by the pressure of the air feed to flow from the brasier and brasier casing through the passageway 56 and under the food cover onto food in the frying pan where the flavor of burning-charcoal gas will be absorbed on the food.

Wood smoke can be included in the generation of burning-charcoal gas by including some suitable dry wood made moist with water or some suitable green wood in the first half of a charge of charcoal put in the brasier. Burning-charcoal gas including wood smoke is strong enough to give raw food a smoky flavor, and raw food with some shortening can be put in the frying pan and given a smoky flavor before frying the food. Also, extra flavor in burning-charcoal gas can be obtained by including in the first half of the charge put in the brasier some charcoal treated with suitable wood smoke or some charcoal treated lightly with suitable wood smoke tar.

An electric charcoal-fire starter including a pan having in the pan near the bottom of the pan an exposed heating element to ignite charcoal put in the pan can be used to ignite charcoal for priming to put in the brasier. Charcoal can be put in a stainless steel coarse mesh-wire strainer and placed in contact with a blue flame from a gas or a kerosene cook stove burner to ignite the charcoal to put in the brasier.

Usually by the time the priming half of a charge of charcoal has burned to ash the food in the frying pan under the food cover has received sufficient flavor and feeding air into the burning charcoal may be discontinued, leaving the cover on the brasier casing, and the fire in the remaining charcoal will smother out. The smothered-out left-over charcoal can be poured out of the brasier into a suitable strainer to sift out the ash, and the left-over charcoal can be used for priming charcoal. If desired, when the food has received sufficient flavor from a charge of burning charcoal the burning left-over charcoal can be poured out of the brasier into a smothering-can having a cover to smoother out the fire and the left-over charcoal saved for priming charcoal.

Heated-earth flavor can be given fried food in the frying pan under the food cover from a small ball or a small cake of moist suitable earth put in the brasier and heated with a charge of left-over charcoal ignited and put in the brasier on the ball or cake of earth and fed with air until some of the vegetable matter in the ball or cake of earth is vaporized. Usually some sandy top soil or some clay subsoil having good flavoring quality can be found under an upland grass meadow, and the earth can be taken and dried and crushed fine enough to dip with a small spoon. A measured quantity of divided clay can be put in a shallow dish and moistened with water and then formed into a ball or a cake to put in the brasier.

Figure 18:
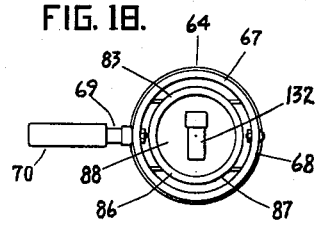
FIGURE 18 is a view similar to FIGURE 3, but in the brasier lying on the bottom of the brasier a vaporizer tube is shown.
Figure 19:
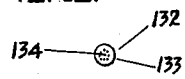
FIGURE 19 is a cap-end view of the vaporizer tube. The tube as shown is removed from the brasier.
Figure 20:
FIGURE 20 is a longitudinal sectional view of the vaporizer tube.

Heated-earth flavor can be given fried food in the frying pan under the food cover from a charge of moist suitable earth put in the vaporizer tube 132 shown in FIGURES 18, 19 and 20 and the tube heated on the bottom of the brasier with a charge of ignited left-over charcoal put in the brasier on the tube and fed with air until some of the vegetable matter in the earth in the tube is vaporized. The vapor generated by heating moist earth in the vaporizer tube escapes through the fine perforations 134 in the removable tube cap 133 into the burning-charcoal gas flowing out of the brasier to the food in the frying pan where some heated earth flavor will be absorbed on the food. A measured charge of sandy earth can be funneled into the vaporized tube and moistened with water dropped into the vaporizer tube from a suitable medicine dropper in charging the vaporizer tube to put in the brasier. The vaporizer tube can be made of stainless steel.

The frying pan 50 has a handle with a grip 53 for placing the frying pan over an electric cook stove heating element, or a cook stove gas or kerosene burner, or a charcoal fire or a wood fire, to fry food in the frying pan. Food cover 55 with the passageway 56 closed can be used for a frying pan cover placed on the frying pan 50 while frying food in the frying pan. Plug 135 shown in FIGURES 14, 15 and 16 has a lower end portion 136 sized to fit in the passageway 56 through the food cover 55, a flange 137 to seat on the rim around the passageway 56, an upper ring 138 for a handle, and the plug end portion 136 can be inserted in the passageway 56 in adapting the food cover 55 for covering the frying pan 50 while frying food in the frying pan.

Food cover 55 can be used to cover food in an electric frying pan having a rim to fit the seat 59, or the food cover can be made with a seat to fit on the rim of an electric frying pan, and food in an electric frying pan can be given a pleasant flavor with gaseous-condiment generated in the brasier in the brasier casing seated on the food cover.

Brasier 83, brasier supports 74—74, brasier casing 64 and handle 69, brasier casing cover 90 and handle 94, food cover 55, air feed pipe 100 and end 101, bellows bottom 106 and cup 109, bellows head 110 and cap 111 and guide rod 113, bands 118—118, nuts 103—103 and 114—115, bolts 71 and 80, and the frying pan 50, can be made of iron, mild steel or stainless steel. Bellows spring 112 can be made of stainless steel spring wire. Grips 53, 70, 95, 104, and knobs 61—61 can be made of suitable plastic or made of suitable heat insulating material. Bellows diaphragm 116 and valve 108 can be made of soft odorless rubber, or a bellows diaphragm and valve can be made of soft odorless rubber, or a bellows diaphragm and valve can be made of suitable cloth and coated with soft odorless rubber or coated with suitable flexible plastic.

Food cover 55, brasier casing 64, and brasier 83 are made seamless, but a useful food cover, brasier casing, or brasier, can be made from suitable sheet metal and have suitable seam construction.

FIGURE 28 shows a brasier casing 142 on a food cover 140 around a vapor passageway 56ª through the food cover, and the brasier casing is rigid with the food cover. The brasier casing has an upper end 143 with a rim 144, a flanged lower end 145 shown in FIGURES 24 and 29, and the flange 146 is spot-welded to the food cover around the passageway 56ª. On the upper end of the brasier casing shown in FIGURE 24 is a removable brasier casing cover 90. The brasier casing cover is shown in FIGURES 25 and 26, and shown off of the brasier casing in FIGURE 9. In the brasier casing shown in FIGURES 24 and 27 is a removable brasier 147, and the brasier removed from the brasier casing is shown in FIGURES 30 and 31. The brasier has a lower end 84ª with a bottom 85ª shown in FIGURE 31, an upper end 86ª with a rim 87ª shown in FIGURE 27, a mouth 88ª to receive gaseous-condiment generating material including air into the brasier and to emit gaseous condiment to flow under the food cover, and the brasier is supported and spaced in the brasier casing on spaced apart supports 148—148—148 which supports are attached rigid with the brasier by spot-welding edge portions 149—149 of each support to the wall 89ª of the brasier. Edge portions 149 and 149 of one of the brasier supports are shown in FIGURE 30. Out of the brasier to the vapor passageway 56ª through the food cover is a vapor passageway 150 shown in FIGURE 29. The two series of arrows 98ª and 98ª in the passageway 150 indicate the way vapor, gas or air, flows in the passageway 150 to and through the passageway 56ª.

Food cover 140 has a lower rim 141, and the food cover is shown in FIGURES 24 and 25 supported on a flat food plate 151 with a sheet of absorbent paper 152 between the food cover rim and the plate. Spaced apart knobs 61ª and 61ª on the food cover can be gripped with the fingers of the hands in placing the food cover on the plate, which plate can be placed on a table or other suitable support.

An air pump 153 shown in FIGURES 24 and 25 has a lower end 154 bolted to the plate 151 with bolts 155—155, a pump cylinder 156 having within the cylinder a suitable pump piston, a piston rod 157 with the pump piston on the lower end of the rod and a grip 158 on the upper end of the rod, and a ball check valve at the lower end of the nipple 159. Grip 158 can be taken in one hand and the pump piston can be moved up and down in the pump cylinder to pump air through the nipple 159 and the air feed pipe. A flexible section 160 of air feed pipe has a lower end 161 on the upper end of the nipple 159, an upper end provided with a screw-on connector 162 screwed on the upper elbow-end 164 of a handle-section 163 of air feed pipe. The handle-section of the air feed pipe has a downturned air outflow end 101ª in hole 91 through the brasier casing cover 90 shown in FIGURE 29, and a grip 104ª to hold with one hand while the other hand has hold of pump grip 158 and pumping air through the air feed pipe sections 160 and 163 into ignited gaseous-condiment generating material 167 in the brasier. As the brasier casing cover 90 is shown in FIGURES 24, 25, 26 and 29 the hole 91 through the brasier casing cover is located over the brasier 147.

Shown in FIGURE 29, the series of arrows 122ª indicate the way air flows from the air outflow end of the air feed pipe to the ignited material 167 in the brasier, and the two series of arrows 98ª and 98ª indicate the way generated gaseous condiment flows out of the brasier to the passageway 56ª through the food cover. The food cover as shown in FIGURES 24 and 25 is vented with a pin 126 inserted between the sheet of paper 152 on the plate 151 and the food cover rim 141. Thus vented air inclosed under the food cover can escape between the food cover rim and the paper as gaseous condiment flows by the air feed pressure through the passageway 56ª and under the food cover onto the cooked food 168 placed on the paper under the food cover where some of the gaseous condiment will be absorbed on the cooked food. A gaseous-condiment generating material which can be ignited and put in the brasier is charcoal carefully made from wood suitable for burning to smoke meat for food and reduced to pieces of suitable size to measure up a split charge of one-half of the charge to be moistened to go in the brasier first and the other half of the charge to be ignited to go in the brasier on top of the moistened charcoal and receive air from the air outflow end of the air feed pipe to burn the ignited charcoal in the brasier.

Food cover 140 and brasier casing 142 and brasier casing cover, brasier 147 and brasier supports, air feed pipe section 163 and air outflow end 101ª can be made of mild steel or stainless steel. Grips 95 and 104ª, and knobs 61ª—61ª can be made of suitable plastic or heat insulating material. Air pump 153 and connector 162 can be made of suiatble material. The flexible section 160 of air feed pipe can be made of suitable odorless material, or made of rubber and fabric including an odorless rubber lining.

FIGURE 32 shows a removable brasier casing 178 on a food cover 170, and the brasier casing removed from the food cover is shown in FIGURES 38, 39 and 40. Shown in FIGURE 34, the food cover has a depressed brasier casing seat 171 around a vapor passageway 56ᵇ through the food cover. The brasier casing has a tubular handle 182, an upper end 143ᵇ with a rim 144ᵇ shown in FIGURES 38 and 39, a lower end 179 shown in FIGURE 40, a bottom 180 with a through vapor passageway 181 shown in FIGURE 40, and in FIGURES 32, 33 and 35 the brasier casing lower end is seated on the brasier casing seat 171 with the passageway 181 adjacent to the passageway 56ᵇ. In the brasier casing shown in FIGURES 32 and 38 is a removable brasier 147, and the brasier not in a brasier casing is shown in FIGURES 30 and 31. The brasier is supported and spaced in the brasier casing 178 on supports 148—148—148 which supports are rigid with the brasier. On the upper end of the brasier casing shown in FIGURE 32 is a removable brasier casing cover 90. The brasier casing cover is shown in FIGURE 33 and shown off of a brasier casing in FIGURE 9. Out of the brasier to the vapor passageway 181 through the brasier casing bottom is a vapor passageway 185 shown in FIGURE 35. The two series of arrows 186 and 186 in the passageway 185 indicate the way vapor, gas or air, flows in the passageway 185 to and through the passageways 181 and 56ᵇ. As the brasier casing cover 90 is shown in FIGURES 32, 33 and 35 the hole 91 through the brasier casing cover is located over the brasier 147.

In the hole 91 through the brasier casing cover shown in FIGURES 32 and 35 is a downturned air outflow end 191 of an air feed pipe handle-section 190, and the air outflow end of the air feed pipe removed from the hole through the brasier casing cover is shown in FIGURES 36 and 37. The air feed pipe air outflow end has an air outflow orifice 102ᵇ shown in FIGURES 35, 36 and 37. On the air feed pipe handle-section is a grip 194, and the screw-on connector 162 of one end 236 of a flexible section of air feed pipe is screwed on the air feed pipe handle-section at the grip end. A flexible section of air feed pipe may extend from an air outflow nipple of a suitable air supply pipe line. Weight 192 on the air feed pipe air outflow end 191 holds the air outflow end of the air feed pipe in the hole 91 through the brasier casing cover and weights the cover while air is feeding into the ignited gaseous-condiment generating material 167 in the brasier. Food cover 170 has a door 172 with hinges 173—173—173 and a latch 174, a heat passageway 175 when the food cover is placed over a gas or a kerosene cook stove burner and used for an oven, and an inside support 176 for a food container containing food to receive gaseous condiment flavor. In FIGURE 35, the series of arrows 122ᵇ indicate the way air flows from the air outflow end of the air feed pipe to the ignited gaseous condiment generating material 167 in the brasier, and the two series of arrows 186 and 186 indicate the way generated gaseous-condiment flows out of the brasier to and through the vapor passageways 181 and 56ᵇ into the food cover where some of the gaseous-condiment will be absorbed on food 197 in pan 196.

Air supply pipe line 200 shown in FIGURE 41 may extend from a suitable motor driven air pump or a suitable motor driven air blower and include an air escape valve 201, an air-flow regulator valve 209, an air-flow stop valve 211, and a nipple 212 to receive the screw-on connector 162 of one end 236 of a flexible section of air feed pipe. Air escape valve 201 shown in section in FIGURE 42 includes a case 202 inclosing a weighted valve 207 in air escape passageway 205 closed at the lower end by the lower end 208 of the weighted valve seated on the valve seat 206, and when air pressure in the pipe line runs high enough to unseat the weighted valve 207 excess air can escape through passageway 205 and holes 204 through the valve case cap 203. Valve 209 can be adjusted with the valve wheel 210 to pass air into the flexible section of the air feed pipe at the rate desired to feed the fire in the brasier. Valve 211 can be opened or closed with the valve wheel 210, and the valve can be closed when it is desired to stop the air-flow into the flexible section of air feed pipe. Valve 211 can be used to start and stop the air feed into the fire in the brasier without changing the adjustment of valve 209.

Air supply pipe line 215 shown in FIGURE 43 may extend from a suitable air tank containing clean compressed air, and include an air-pressure regulator valve 216, an air-flow regulator valve 209, an air-flow stop valve 211, and a nipple 212 to receive the screw-on connector 162 of one end 236 of a flexible section of air feed pipe. Air pressure in the pipe line to the air-pressure regulator valve 216 may be about as high as the air pressure in the air tank, and the air-pressure regulator valve may be adjusted with the adjusting screw 217 to reduce the air pressure in that portion of the pipe line from the air-pressure regulator valve to the air-flow regulator valve 209 low enough to properly regulate air-flow into the flexible section of the air feed pipe. Valve 209 can be adjusted with the valve wheel 210 to pass air into the flexible section of the air feed pipe at the rate desired to feed the fire in the brasier. Air under pressure as low as four ounces per square inch can be regulated through valve 209 to feed into the fire in the brasier. Valve 211 can be opened or closed with the valve wheel 210 and the valve can be closed when it is desired to stop the air-flow into the flexible section of the air feed pipe. Valve 211 can be used to start and stop the air-feed into the fire in the brasier without changing the adjustment or set position of the air-flow regulator valve 209.

Overhead air supply pipe line 220 shown in FIGURE 44 may extend from a suitable air tank containing clean compressed air, and the pipe line may include an air-pressure regulator valve 216, an air-flow regulator valve 209, a weight and lever closed air-flow stop valve 221 having a nipple 222 to receive the connector 162 of one end 236 of a flexible section 235 of air feed pipe, and the stop valve may be provided with a hanger 237 or other suitable support which may be attached to a canopy, ceiling, beam, wall, post, or something rigid. Stop valve 221, shown in longitudinal section in FIGURE 45 with the valve 224 in the open position, has the valve member 224 on the inner end of an endwise movable valve rod 225 and an adjustable head 227 screwthreaded on the outer end 226 of the valve rod 225, a helix spiral spring 228 pressing outward against the head 227 to open the valve member 224, a valve closing lever 229 pivoted at 232 on an arm 234 which arm is rigid with the valve spring housing 233, and the valve closing lever has one end 230 at the outer end 226 of the valve rod and a projecting end 231 to hang the air feed pipe air outflow end weight 192 on to close the valve member 224 on the seat 223. Weight 192 is provided with a projecting ring 193 to hang the weight on the valve closing lever end 231 as shown in FIGURE 44 to hold the valve member 224 closed. Air-pressure regulator valve 216 can be adjusted with the adjusting screw 217 to hold air pressure in the portion of the pipe line from the air-pressure regulator valve to the air-flow regulator valve low enough that valve 209 can be adjusted with valve wheel 210 to pass air into the flexible section 235 of the air feed pipe at the rate desired to feed the fire in the brasier.

Suitable charcoal can be burned in the brasier in brasier casing 178 on food cover 170 to give pieces of fried food or pieces of roasted food in pan 196 burning-charcoal gas flavor. Pieces of meat, fowl or fish, pieces of pork fat to go in pork sausage, pieces of beef fat to go in ground beef, or shortening for frying, can be put in pan 196 in food cover 170 and given a smoky flavor from suitable wood burned in the brasier. In burning wood in the brasier the brasier can be charged with a split charge of about one-half of the charge in suitable green wood put in the brasier first or suitable dry wood made moist with water and put in the brasier first and the other half of the charge in live coals or ignited charcoal put in the brasier on top of the wood. Feeding air at a rate below moderate into the live coals or ignited charcoal in the brasier for about fifteen minutes will generate enough heat in the brasier to char the wood, and the burning charcoal gas and the wood smoke generated in the brasier will flow out of the brasier and brasier casing and through the passageways 181 and 56ᵇ to the food in pan 196. Wood for burning in the brasier can be any kind of wood suitable for burning to smoke meat for food, and free of contamination. The wood can be prepared in the form of pieces or chips small enough to measure for a charge and funnel into the brasier.

Brasier casing 178 and handle 182, and food cover 170 and inside support 176 can be made of mild steel or stainless steel. Pipe section 190 can be made of mild steel tubing or iron pipe. Grips 70ᵇ, 95 and 194 can be made of suitable heat insulating material. Air feed pipe air outflow end 191 and weight 192 can be made of cast iron or mild steel, and plated with rust resisting metal if desired. Flexible air feed pipe section 235 can be made of suitable odorless material, or made of rubber and fabric including an odorless rubber lining.

Funnel 240, shown in FIGURE 46, has a small end 241 which can be put in the mouth of the brasier when the brasier casing cover is removed, and gaseous-condiment generating material can be poured through the funnel into the brasier without taking the brasier out of the brasier casing. The funnel can be made of stainless steel or other suitable metal.

I claim:

1. In a gaseous-condiment generator, a food cover, a vapor passageway through said food cover, a brasier casing seat on said food cover around said vapor passageway through said food cover, a removable brasier casing on said food cover, said brasier casing having a lower end with a rim and an upper end with a rim, the lower end of said brasier casing seated on said brasier casing seat, a brasier in said brasier casing, said brasier supported and spaced in said brasier casing, a removable brasier casing cover on the upper end of said brasier casing, a vapor passageway out of said brasier to said vapor passageway through said food cover, a hole through said brasier casing cover, said hole through said brasier casing cover located over said brasier, an air feed pipe, said air feed pipe extending above said brasier casing cover to said hole through said brasier casing cover, and said air feed pipe having a downturned outflow end in said hole through said brasier casing cover.

2. In a gaseous-condiment generator, a food cover, a vapor passageway through said food cover, a brasier casing on said food cover around said vapor passageway through said food cover, said brasier casing rigid with said food cover and having an upper end with a rim, a brasier in said brasier casing, said brasier supported and spaced in said brasier casing, a removable brasier casing cover on the upper end of said brasier casing, a vapor passageway out of said brasier to said vapor passageway through said food cover, a hole through said brasier casing cover, said hole through said brasier casing cover located over said brasier, an air feed pipe, said air feed pipe extending above said brasier casing cover to said hole through said brasier casing cover, and said air feed pipe having a downturned outflow end in said hole through said brasier casing cover.

3. In a gaseous-condiment generator, a food cover, a vapor passageway through said food cover, a brasier casing seat on said food cover around said vapor passageway through said food cover, a removable brasier casing on said food cover, said brasier casing having a lower end and an upper end, a rim at the upper end of said brasier casing, a brasier casing bottom at the lower end of said brasier casing, the lower end of said brasier casing seated on said brasier casing seat, a vapor passageway through said brasier casing bottom adjacent to said vapor passageway through said food cover, a brasier in said brasier casing, said brasier supported and spaced in said brasier casing, a removable brasier casing cover on the upper end of said brasier casing, a vapor passageway out of said brasier to said vapor passageway through said brasier casing bottom, a hole through said brasier casing cover, said hole through said brasier casing cover located over said brasier, an air feed pipe, said air feed pipe extending above said brasier casing cover to said hole through said brasier casing cover, and said air feed pipe having a downturned outflow end in said hole through said brasier casing cover.

References Cited in the file of this patent
UNITED STATES PATENTS 2,591,072 Hughes ---------------- Apr. 1, 1952

FOREIGN PATENTS 772,887 France ---------------- Aug. 20, 1934